(12) United States Patent
Lundstedt (10) Patent No.: US 11,371,421 B2
(45) Date of Patent: Jun. 28, 2022

(54) METHOD FOR CONTROLLING A TURBOCHARGER SYSTEM AND A TURBOCHARGER SYSTEM FOR A COMBUSTION ENGINE

(71) Applicant: VOLVO TRUCK CORPORATION, Gothenburg (SE)

(72) Inventor: Björn Lundstedt, Lerum (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 29 days.

(21) Appl. No.: 16/766,445

(22) PCT Filed: Nov. 24, 2017

(86) PCT No.: PCT/EP2017/080406
§ 371 (c)(1),
(2) Date: May 22, 2020

(87) PCT Pub. No.: WO2019/101336
PCT Pub. Date: May 31, 2019

(65) Prior Publication Data
US 2021/0025319 A1 Jan. 28, 2021

(51) Int. Cl.
*F02B 37/10* (2006.01)
*F02B 21/00* (2006.01)
*F02D 41/12* (2006.01)

(52) U.S. Cl.
CPC ............ *F02B 37/10* (2013.01); *F02B 21/00* (2013.01); *F02D 41/12* (2013.01)

(58) Field of Classification Search
CPC ......... F02B 37/10; F02B 21/00; F02D 41/12; F02D 41/0007; F02D 41/10; F02D 41/062; F02N 11/0814
See application file for complete search history.

(56) References Cited

U.S. PATENT DOCUMENTS 8,387,382 B1 * 3/2013 Dunn .................. F02B 39/12
60/624
10,011,282 B2 * 7/2018 Jerwick .................. B60W 10/06
(Continued)

FOREIGN PATENT DOCUMENTS

EP     3095982 A1    11/2016
EP     3179080 A1     6/2017
(Continued)

OTHER PUBLICATIONS

International Search Report and Written Opinion dated Jul. 23, 2018 in corresponding International PCT Application No. PCT/EP2017/080406, 10 pages.
(Continued)

*Primary Examiner* — J. Todd Newton, Esq.
(74) *Attorney, Agent, or Firm* — Venable LLP; Jeffri A. Kaminski (57) ABSTRACT

The invention relates to a method for controlling a turbocharger system (10) fluidly connected to an exhaust manifold (102) of a combustion engine (100). The turbocharger system comprises a tank (40) with pressurized gas, and a turbocharger turbine (22) operable by exhaust gases from the exhaust manifold. The tank is fluidly connectable to the turbocharger turbine. The method comprises the steps of: determining a first operational mode in which zero fuel, or only a predetermined low amount of fuel, is injected to the combustion engine, for a predetermined time period; and, after the predetermined time period, injecting pressurized gas from the tank to drive the turbocharger turbine, such that the turbocharger turbine is activated by the pressurized gas.

23 Claims, 3 Drawing Sheets

(56) References Cited

U.S. PATENT DOCUMENTS

| | | | | |
|---|---|---|---|---|
| 2007/0246008 A1* | 10/2007 | Gerum | ............... | F02M 23/04 |
| | | | | 123/316 |
| 2008/0133110 A1* | 6/2008 | Vetrovec | ............. | F02D 41/10 |
| | | | | 701/103 |
| 2011/0041496 A1* | 2/2011 | Mayr | .................. | F02D 13/04 |
| | | | | 60/611 |
| 2011/0132335 A1* | 6/2011 | Pursifull | .............. | F02B 21/00 |
| | | | | 123/564 |
| 2011/0276204 A1* | 11/2011 | Shutty | ................. | F02B 33/44 |
| | | | | 701/22 |
| 2013/0305709 A1* | 11/2013 | Rollinger | ............ | F02M 26/40 |
| | | | | 60/601 |

FOREIGN PATENT DOCUMENTS

| | | |
|---|---|---|
| FR | 872858 A | 6/1942 |
| WO | 2014009770 A1 | 1/2014 |
| WO | 2014092578 A1 | 6/2014 |
| WO | 20140195345 A1 | 12/2014 |

OTHER PUBLICATIONS

Cieslar, D. et al., "A Novel System for Reducing Turbo-Lag by Injection of Compressed Gas into the Exhaust Manifold", SAE International, Apr. 8, 2013, 8 pages.

Vasile, I. et al., "Rapid Start of Hybrid Pneumatic Engines", Proceedings of the 2009 IFAC Workshop on Engine and Powertrain Control, Nov. 30, 2009, 8 pages.

* cited by examiner

METHOD FOR CONTROLLING A TURBOCHARGER SYSTEM AND A TURBOCHARGER SYSTEM FOR A COMBUSTION ENGINE

CROSS-REFERENCE TO RELATED APPLICATIONS

This application is a U.S. National Stage application of PCT/EP2017/080406, filed Nov. 24, 2017 and published on May 31, 2019 as WO 2019/101336 A1, all of which is hereby incorporated by reference in its entirety.

TECHNICAL FIELD

The invention relates to a method for controlling a turbocharger system fluidly connected to an exhaust manifold of a combustion engine, to a control unit configured to perform the steps of the method for controlling a turbocharger system, to a turbocharger system, and to a vehicle comprising such turbocharger system or such control unit.

The invention is applicable on vehicles, in particularly low, medium and heavy duty vehicles commonly referred to as trucks. Although the invention will mainly be described in relation to a truck, it may also be applicable for other type of vehicles. Moreover, the invention is applicable to stationary combustion engines, such as e.g. combustion engines designed and configured for the production of electricity.

BACKGROUND

Combustion engines are used in moving applications such as e.g. in vehicles such as trucks or lorries designed to transport cargo. Combustion engines are also used in stationary applications e.g. for the production of electricity. Combustion engines typically vary in size and power depending on the application.

A combustion engine can typically be operated in various operational modes, or engine operational modes. For example, the combustion engine may be operated to drive the main load of the combustion engine, e.g. in the case the combustion engine is comprised in a vehicle, to propel the vehicle, and in the case the combustion engine is for generating electricity, to drive a generator coupled to the combustion engine. Such engine operational modes may be referred to as main load engine operational modes, in which the combustion of fuel in the combustion engine results in a torque, or a transferred torque, to the engine crankshaft. Another example of an engine operational mode is complete shut down or shut-off of the combustion engine. In such engine operation modes, the combustion engine is turned off or is deactivated, and the engine crankshaft is not moving. Thus, no fuel is combusted in the combustion engine. Hence, in the case the combustion engine is comprised in a vehicle, the vehicle is stopped or standstill, and in the case the combustion engine is for generating electricity, the generator is stopped or turned off. Furthermore, in yet another example of an engine operational mode, the combustion engine is operated in a zero fuel condition, in which the combustion engine is not positively transferring energy to the engine crankshaft, but the engine crankshaft is moving. Such engine operational mode of zero fuel may e.g. be performed during engine braking of the combustion engine.

For some engine operational modes, or when changing from one engine operational mode to another engine operational mode, the torque response is low. Thus, there is a need in the industry for further improvements relating to improved usability of the engine.

SUMMARY

In view of the above-mentioned and other drawbacks of the prior art, the object of the present inventive concept is to provide an improved method of controlling a turbocharger system fluidly connected to an exhaust manifold of a combustion engine, and more specifically, for at least some operational modes of the combustion engine, to improve the torque response of the combustion engine. The object is achieved by a method according to claim 1.

According to a first aspect of the invention, a method for controlling a turbocharger system fluidly connected to an exhaust manifold of a combustion engine is provided. The turbocharger system comprises a tank with pressurized gas, and a turbocharger turbine operable by exhaust gases from said exhaust manifold, said tank being fluidly connectable to said turbocharger turbine. The method comprises the steps of:

determining a first operational mode in which zero fuel, or only a predetermined low amount of fuel, is injected to the combustion engine, for a predetermined time period; and, after said predetermined time period, injecting pressurized gas from said tank to drive said turbocharger turbine, such that the turbocharger turbine is activated by said pressurized gas.

By the provision of a method which comprises the step of injecting pressurized gas from said tank to drive said turbocharger turbine, such that the turbocharger turbine is activated by said pressurized gas, after a predetermined time period of which zero fuel, or only a predetermined low amount of fuel, is injected to the combustion engine, the torque response can be kept at a relatively high level. That is, even though the exhaust energy from the combustion engine is limited, and the turbo pressure (which may be referred to as boost pressure) is low, due to the engine operational mode of zero fuel, or only a predetermined low amount of fuel, injected to the combustion engine, the torque response can be kept at a relatively high level as the tank provides for pressurized gas to the turbocharger turbine. Thus, the method may be referred to as a method for controlling the use of pressurized gas to the turbocharger turbine. Moreover, by injecting pressurized gas from said tank to drive said turbocharger turbine after said predetermined time period of said first operational mode, feature gains of the turbocharger system can be balanced with the cost of running the turbocharger system, as the turbocharger turbine is activated only after said predetermined time period.

The predetermined time period of which zero fuel, or only a predetermined low amount of fuel, is injected to the combustion engine, allows for the tank in the turbocharger system to be recharged. Hereby a good repeatability of the turbocharger system is provided. More specifically, as the tank may (at least partly) be charged or recharged during the predetermined time period of which zero fuel, or only a predetermined low amount of fuel, is injected to the combustion engine, the turbocharger system may be prepared, or be set ready, for the step of injecting pressurized gas from said tank to drive said turbocharger turbine. Thus, the tank can be filled (or charged or recharged) between each use of the turbocharger system in order to provide for a good repeatability of the turbocharger system. It should be noted that the terms "filled" and "charged" are used interchangeably when describing the amount of pressurized gas present in the tank, and that a "100% filled" tank corresponds to a tank which is "100% charged", i.e. the nominal working pressure of the tank, or a tank which is held at the design level, or design pressure, of the turbocharger system. It should be noted that the tank may not be fully charged, or fully recharged during this predetermined time period, but it may e.g. be only partially charged, or partially recharged (i.e. only partially filled). However, the tank may still be sufficiently charged or recharged to improve the torque response after said step of determining said first operational mode. However, according to one alternative example embodiment, the predetermined time period is adapted to correspond to the time it takes to charge, or recharge, the tank, e.g. the time it takes to fill the tank from a below than 10% charged tank to an above 90% charged tank. Hereby, the tank may be charged to at least 90% of the design pressure, e.g. during the step of determining said first operational mode.

Moreover, as the turbocharger system may provide, or at least improve, the torque response, the combustion engine can be operated, or adjusted, based on other parameters than torque response. For example, and according to at least one example embodiment, the combustion engine may be operated to focus on engine performance or on providing heat to an exhaust after treatment system of the combustion engine, as the turbocharger system may provide, or at least improve, the torque response. For example, and according to at least one example embodiment, the combustion engine may be operated to prioritize catalytic temperature (e.g. by keeping a relatively low air flow through the combustion engine and downstream components, such as e.g. a catalyst component in the exhaust after treatment system). In other words, the combustion engine may be operated in a predefined mode in response to that the turbocharger system provides, or at least improves, the torque response.

It should be noted that the term "determining" a specific parameter (as e.g. said first operational mode) may comprise the means of detecting, measuring or modelling the specific parameter. However, the term "determining" a specific parameter may alternatively indicate that the specific parameter is set or controlled by e.g. a control unit, whereby instructions to set or to control the specific parameter is sent as an output signal from the control unit to the relevant component(s). For example, the fuel injection may be measured by means an injection rate measurement (e.g. using a Laser Doppler Anemometer), and/or the fuel injection may be set by a control unit.

According to one embodiment, the step of determining said first operational mode and the step of injecting pressurized gas from said tank to drive said turbocharger turbine, are repeated. Thus, the tank may be charged or recharged repeatedly, i.e. during each step of determining said first operational mode.

According to one embodiment, said predetermined time period is at least 2 seconds long, such as e.g. between 3 seconds and 20 seconds. According to one embodiment, said predetermined time period is at least 3 seconds long, or at least 4 second long.

After such time period, the injection of pressurized gas has a relatively good effect on the turbocharger turbine, and thus, the torque response can be improved. Moreover, according to at least one embodiment, such time period prevents the engine crankshaft from stopping, and a complete shut down of the combustion engine may be prevented.

According to one embodiment, the method comprises the step of charging, and/or recharging the tank with pressurized gas. The charging, or recharging, may e.g. be carried out at least partly during the step of determining said first operational mode.

According to one embodiment, said turbocharger system comprises a compressor for supplying pressurized gas to said tank, and the method comprises the step of charging or recharging the tank with pressurized gas using said compressor, during, or subsequent to, a step of determining said first operational mode in which zero fuel, or only a predetermined low amount of fuel, is injected to the combustion engine.

Thus, the compressor may be used to repeatedly charge or recharge the tank, e.g. during each step of determining said first operational mode, or during said first operational mode. The compressor may for example be a mechanically driven compressor, e.g. a mechanically driven air compressor, driven by the combustion engine. Alternatively, the compressor may be an electrically driven compressor using ambient air, and/or recirculating gas from the turbocharger compressor. According to one alternative embodiment, the tank is charged or recharged by using outlet gas from the turbocharger turbine (so called boost air or gas at boost pressure). In the latter case, no separate compression of the gas is necessary, however, the gas pressure in the tank is limited to the present gas pressure of the outlet gas from the turbocharger turbine. Thus, the tank may be used to store boost air for a later use.

According to one embodiment, the step of determining said first operational mode comprises determining an operational mode in which there is no, or only a very low, boost pressure for the turbocharger turbine, for at least said predetermined time period. Hereby, the determination of zero fuel, or only a predetermined low amount of fuel, injected to the combustion engine, may be modelled, or be based on, the boost pressure for the turbocharger turbine (which may be measured or modelled). In other words, the lack of, or the presence of a very low, boost pressure may be used as an indication of said first operational mode.

It should be noted that said step of determining a first operational mode in which zero fuel, or only a predetermined low amount of fuel, is injected to the combustion engine, for a predetermined time period, may comprise the step of detecting said first operational mode during a time period at least corresponding to said predetermined time period.

Additionally or alternatively, said step of determining a first operational mode in which zero fuel, or only a predetermined low amount of fuel, is injected to the combustion engine, for a predetermined time period, may comprise the step setting (for example in a control unit connected to the combustion engine and the turbocharger system, and being configured to control the operation of the combustion engine) said first operational mode during a time period at least corresponding to said predetermined time period. Hence, the combustion engine may be operated in said first operational mode for said predetermined time, and said predetermined time may be determined by e.g. detecting said first operational mode, or by setting said first operational mode.

According to one embodiment the steps of determining a first operational mode in which zero fuel, or only a predetermined low amount of fuel, is injected to the combustion engine, for a predetermined time period; and, after said predetermined time period, injecting pressurized gas from said tank to drive said turbocharger turbine, such that the turbocharger turbine is activated by said pressurized gas, may be referred to as a common step of injecting pressurized gas from said tank to drive said turbocharger turbine, such that the turbocharger turbine is activated by said pressurized gas, after a predetermined time period of the first operational mode in which zero fuel, or only a predetermined low amount of fuel, is injected to the combustion engine.

It should be noted that when referring to said step of determining a first operational mode in which zero fuel, or only a predetermined low amount of fuel, is injected to the combustion engine, for a predetermined time period, only the term "determining said first operational mode" is used for brevity reasons. Moreover, it should be understood that the step of injecting pressurized gas from said tank to drive said turbocharger turbine, such that the turbocharger turbine is activated by said pressurized gas, may be shortened by the expression "injecting pressurized gas from said tank to drive said turbocharger turbine", "activating said turbocharger turbine" or "activating said turbocharger system".

It should be understood that the combustion engine typically has a plurality of operational modes, or engine operational modes, i.e. modes or states or conditions of how the combustion engine is operated. Hence, in the above referred to first operational mode, the combustion engine is operated such that zero fuel, or only a predetermined low amount of fuel, is injected to the combustion engine. According to one embodiment, the first operational mode is followed by a second operational mode in which fuel, at least at an amount above the predetermined low amount of fuel, is injected into the combustion engine. Thus, said step of injecting pressurized gas from said tank to drive said turbocharger turbine may occur at least partly during said second operational mode According to one embodiment, said first operational mode is ended prior to said step of injecting pressurized gas from said tank to drive said turbocharger turbine. According to at least one example embodiment, the step of injecting pressurized gas from said tank to drive said turbocharger turbine, at least partly results in an engine operational mode change from the first operational mode to the second operational mode.

Hence, the step of determining said first operational mode, may be referred to as the step of determining a zero fuel injection condition, or a predetermined low amount of fuel injection condition, for said predetermined time.

According to one embodiment, in which said first operational mode is an operational mode of zero fuel injection to the combustion engine, said step of determining said first operational mode comprises determining a zero fuel condition in which zero fuel is injected to the combustion engine for the predetermined time period.

That is, for such embodiments, the alternative of having a predetermined low amount of fuel injected to the combustion engine is omitted from the method of the invention. Thus, for such embodiments, gas is injected from said tank to drive said turbocharger turbine, such that the turbocharger turbine is activated by said pressurized gas, after a predetermined time period of the first operational mode in which zero fuel is injected to the combustion engine.

According to one embodiment, said predetermined low amount of fuel is defined as the amount of fuel required for maintaining a negative momentum to the engine crankshaft to which the combustion engine is coupled to.

Hereby, the combustion engine will not contribute to the rotation of the engine crankshaft. Thus, it should be understood that in said first operational mode, the engine crankshaft is driving the combustion engine. Thus, the first operational mode may be referred to as a negative engine operational mode. This is in contrast to an operational mode in which the amount of fuel injected to the combustion engine is high enough for contributing to the rotation of the engine crankshaft, such operation mode may be referred to as a positive engine operational mode.

The predetermined low amount of fuel to the combustion engine may according to one embodiment be defined as predetermined as the amount of fuel is set to be below a limit in which the combustion engine contributes to the rotation of the engine crankshaft, and be defined as being of a relatively low amount as compared to any operational modes (e.g. engine operational modes) which results in a positive contribution to the rotation of the engine crankshaft (for a vehicle application, that is to contribute in propelling the vehicle, and for a electricity engine application, that is to contribute in generating electricity). According to one embodiment, the predetermined low amount of fuel is defined as an amount of fuel injected into the combustion engine which does not contribute in moving the vehicle, i.e. which does not contribute in propelling the vehicle (for the vehicle application) or which does not contribute in the generation of electricity (for the electricity engine application). The predetermined low amount of fuel may according to one embodiment be referred to as a leakage flow, or a controlled leakage flow, of fuel into the combustion engine.

By having a predetermined low amount of fuel injected into the combustion engine, downstream components to the combustion engine, such as e.g. a catalytic component in the exhaust after treatment system, may be provided with at least some heat (stemming from the injected fuel) in order to improve the function of the catalytic component.

According to one embodiment, the method comprises the step of:

initiating fuel injection to the combustion engine after said step of determining said first operational mode, and prior to said step of injecting pressurized gas from said tank to drive said turbocharger turbine.

Hereby, the operational mode of the combustion engine may be changed from the first operational mode, to e.g. the second operational mode (being e.g. a main load engine operational mode).

It should be understood that initiating fuel injection to the combustion engine should be interpreted as the act of injecting fuel, at least at an amount above said predetermined low amount of fuel, to the combustion engine. Hence, even though said predetermined low amount of fuel may be injected to the combustion engine during the first operational mode, fuel injection may be initiated in the sense of injecting fuel with the purpose to drive the combustion engine in order to contribute to the rotation of the engine crankshaft.

Hereby, the timing of activating the turbocharger turbine may be adapted to improve the torque response.

As a complement to, or as an alternative to, the initiation of fuel injection, the step of injecting pressurized gas from said tank to drive said turbocharger turbine may be preceded by e.g. that one or more actuators in the combustion engine has been requested to new positions, that an inlet throttle to the combustion engine is opened, that a closed damper or throttle in the exhaust system of the combustion engine (e.g. before or after the turbocharger) is opened, that a back pressure device is removed, and/or that valve timing of the combustion engine is adjusted.

According to one embodiment, the step of determining said first operational mode is performed during an operational mode in which the engine crankshaft is rotating.

For a vehicle application, the step of determining said first operational mode is performed during a driving mode of the vehicle. That is, in the driving mode of the vehicle the engine crankshaft is rotating, and the vehicle is propelled. According to one embodiment, the first operational mode is comprised in a driving mode of the vehicle. That is the driving mode of the vehicle is defined as that the engine crankshaft coupled to the combustion engine is rotating, and that zero fuel, or only a predetermined low amount of fuel, is injected to the combustion engine. However, as stated before, in the first operational mode, the combustion engine is not contributing to the rotation of the engine crankshaft, but is rather braking or reducing the rotation of the engine crankshaft.

For non-vehicle application of the invention, the driving mode of the vehicle can correspond to an engine crankshaft rotating mode, i.e. an operational mode in which an engine crankshaft connected to the combustion engine is rotating.

Hence, for a vehicle application, said first operational mode is not to be understood as that the vehicle has been completely shut down or shut-off, but that the vehicle is typically moving and that the engine crankshaft is rotating. Hence, a (complete) start-up of the vehicle is typically not needed after the predetermined time in said first operational mode, in order to operate the combustion engine and the turbocharger system. In other words, the combustion engine may be referred to as being set in a stand-by mode.

According to one embodiment, the method comprises the step of motoring, engine braking or providing fuel cut off to the combustion engine prior to the step of injecting pressurized gas from said tank to drive said turbocharger turbine.

According to one embodiment, the operational mode of motoring, engine braking or providing fuel cut off to the combustion engine may be comprised in said first operational mode, i.e. in which zero fuel, or only a predetermined low amount of fuel, is injected to the combustion engine. During for example motoring of the combustion engine, the engine crankshaft is rotating (e.g. in response to an electric motor, or as a lag in the vehicle's propelling system) and is thereby driving the combustion engine.

Hereby, the engine may be operated in various operational modes in which zero fuel, or only a predetermined low amount of fuel, is injected to the combustion engine, in which the torque response is low, and for which the injection of pressurized gas from said tank may be used to improve the torque response.

According to one embodiment, the method comprises the step of determining a motoring condition, an engine braking condition or a fuel cut off condition, of the combustion engine prior to the step of injecting pressurized gas from said tank to drive said turbocharger turbine.

Thus, the motoring, engine braking or fuel cut off may be detected, or may be set, by e.g. a control unit. The motoring, engine braking or fuel cut off may be occurring, or may be determined, for a time period shorter than, or equal to, said predetermined time period.

According to one embodiment, the method comprises the steps of declutching the combustion engine from the engine crankshaft, and stopping the combustion engine prior to the step of injecting pressurized gas from said tank to drive said turbocharger turbine.

In other words, the engine crankshaft will not drive the combustion engine, as the combustion engine is declutched from the engine crankshaft. Thus, the amount of air or gas which is allowed to flow through the combustion engine and the subsequent downstream components may be controlled. For example, the flow of air or gas which may act as a cooling agent of a downstream arranged catalytic component may be reduced.

According to one embodiment, the operational mode of declutching the combustion engine from the engine crankshaft, and stopping the combustion engine may be comprised in said first operational mode, i.e. in which zero fuel, or only a predetermined low amount of fuel, is injected to the combustion engine.

According to one embodiment, the method comprises the step of determining a declutch of the combustion engine from the engine crankshaft, and determining a stop of the combustion engine, prior to the step of injecting pressurized gas from said tank to drive said turbocharger turbine.

Thus, the declutching and the combustion engine stop may be detected, or may be set, by e.g. a control unit. The declutching and the combustion engine stop may be occurring, or may be determined, for a time period shorter than, or equal to, said predetermined time period.

According to one embodiment, said turbocharger system comprises a valve for controlling the release of pressurized gas from said tank, comprising the step of:
operating the valve to release pressurized gas needed for activating the turbocharger turbine.

Hereby, a relatively simple but yet effective means for controlling the release of pressurized gas from the tank is provided. The valve is preferably arranged somewhere between said tank and said turbocharger turbine.

It should be understood that when stating that the tank is fluidly connectable to said turbocharger turbine, fluid in the tank may, in at least some operational modes, flow from the tank to the turbocharger turbine. For example, in operational modes in which the valve is opened (i.e. the valve allows fluid to pass), the tank may be in fluid connection with the turbocharger system, e.g. via a valve pipe connected to the exhaust manifold or the exhaust manifold pipe. Correspondingly, in operational modes in which the valve is closed (i.e. the valve prevents fluid to pass), no fluid is allowed to fluid from the tank to the turbocharger turbine. In other words, a fluid distribution system is typically arranged between the tank and the turbocharger system. The distribution system may comprise at least one pipe or conduit, and/or at least one valve, and/or at least some part or portion of the combustion engine.

According to one embodiment, the valve is operated in such a way that the pressurized gas is released from said tank during at least 0.5 second, or at least 1 second, such as e.g. between 1 second and 5 seconds.

Hereby, enough pressurized gas to activate the turbocharger system can be released from said tank. For example, the tank can be fully depleted during the release of the pressurized gas during the at least 0.5 second, or at least 1 second, such as e.g. between 1 second and 5 seconds.

According to one embodiment, said turbocharger system further comprises a turbocharger compressor driven by said turbocharger turbine, and said combustion engine comprises an inlet manifold fluidly connected to said turbocharger compressor, wherein said valve controls the release of pressurized gas from said tank to the exhaust manifold of the 20 combustion engine, to an exhaust manifold pipe arranged between the exhaust manifold and the turbocharger turbine, to the turbocharger turbine casing, to the inlet manifold of the combustion engine, to the turbocharger compressor casing, or to an inlet manifold pipe arranged between the inlet manifold and the turbocharger compressor.

In other words, the valve may be fluidly connected to (e.g. via a valve pipe) the exhaust manifold, the exhaust manifold pipe, the turbocharger turbine casing, the inlet manifold, the turbocharger compressor casing, or to the inlet manifold pipe.

Thus, the pressurized gas from said tank may be injected on different locations before, to, or after the combustion engine. In embodiments where the pressurized gas from said tank is injected upstream of the exhaust manifold of said combustion engine, i.e. to the inlet manifold of said combustion engine, to an inlet manifold pipe arranged between the inlet manifold and the turbocharger compressor, and to the turbocharger compressor casing, the injected pressurized gas will increase the fluid pressure and allow for an increased fuel injection and/or an increase amount of burnt fuel in the combustion engine, which will result in an increased energy in the combustion engine, and hence an increased pressure in the exhaust manifold and further to the turbocharger turbine. In other words, the injection of pressurized gas upstream of the exhaust manifold, results in an increased work of the turbocharger turbine. Thus, the pressurized gas is injected from said tank to activate the turbocharger turbine.

According to one embodiment, said combustion engine is an internal combustion engine, such as e.g. a diesel driven engine.

According to at least a second aspect of the present invention, the object is achieved by a control unit according to claim 13. The control unit is configured to perform the steps of the method described in accordance with the first aspect of the invention.

Effects and features of this second aspect of the present invention are largely analogous to those described above in connection with the first aspect of the inventive concept. Embodiments mentioned in relation to the first aspect of the present invention are largely compatible with the second aspect of the invention.

According to at least a third aspect of the invention, the object is achieved by a turbocharger system according to claim 14. More specifically, the invention relates to a turbocharger system for use together with a combustion engine having an exhaust manifold. The turbocharger system comprising:

a turbocharger turbine operable by exhaust gases from said exhaust manifold, a tank comprising pressurized gas, said tank being fluidly connectable to said turbocharger turbine, and a control unit wherein the control unit is configured to:

determine a first operational mode in which zero fuel, or only a predetermined low amount of fuel, is injected to the combustion engine, for a predetermined time period; and, after said predetermined time period, initiate injection of pressurized gas from said tank to drive said turbocharger turbine, such that the turbocharger turbine is activated by said pressurized gas.

Effects and features of this third aspect of the present invention are largely analogous to those described above in connection with the first and second aspects of the inventive concept. Embodiments mentioned in relation to the first aspect of the present invention are largely compatible with the third aspect of the invention, of which some embodiments are explicitly mentioned in the following. In other words, a method for controlling a turbocharger system as described with any of the embodiments of the first aspect of the invention is applicable to, or may make use of, the turbocharger system described in relation to the third aspect of the invention.

The turbocharger system may further comprise a turbocharger compressor driven by the turbocharger turbine to compress intake air to said combustion engine. Hence the turbocharger system comprises a turbocharger comprising the turbocharger turbine and the turbocharger compressor mechanically coupled to the turbocharger turbine by a turbine shaft. The turbocharger turbine is driven by exhaust gases from said combustion engine, and/or by pressurized air from said tank, and the turbocharger compressor is driven by the turbocharger turbine via said turbine shaft.

The combustion engine typically comprises an inlet manifold fluidly connected to said turbocharger compressor, for supplying fuel and/or air and/or a fuel-air mixture to the combustion engine. The inlet manifold is typically fluidly connected to the turbocharger compressor via an inlet manifold pipe arranged between the inlet manifold and the turbocharger compressor. Correspondingly, the exhaust manifold is typically fluidly connected to the turbocharger turbine via an exhaust manifold pipe arranged between the exhaust manifold and the turbocharger turbine.

For example, and according to one embodiment, said predetermined time period is at least 2 seconds long, such as e.g. between 3 seconds and 20 seconds.

For example, and according to one embodiment, the turbocharger system comprises a valve for controlling the release of pressurized gas from said tank, wherein said control unit is configured to control the operation of the valve to release pressurized gas needed for activating the turbocharger turbine for a pre-set time period of at least 0.5 second, or at least 1 second, or between 1 second and 5 seconds.

The valve may control the release of pressurized gas from said tank to various locations before, to, and after the combustion engine, typically via a valve pipe fluidly connected to the valve and the respective various locations. For example, the valve may be fluidly connected to, and thus configured to release the pressurized air to, the exhaust manifold, the exhaust manifold pipe, the turbocharger turbine casing, the inlet manifold, the turbocharger compressor casing, and/or the inlet manifold pipe.

For example, and according to one embodiment, the turbocharger system comprises a compressor for supplying pressurized gas to said tank, wherein said control unit is configured to initiate charging or recharging of the tank with pressurized gas using said compressor during, or subsequent to, a step of determining a second operational mode in which zero fuel, or only a predetermined low amount of fuel, is injected to the combustion engine.

According to at least a fourth aspect of the invention, the object is achieved by a vehicle according to claim 18. More specifically, the invention relates to a vehicle comprising a turbocharger system in accordance with the third aspect of the invention, or a control unit in accordance with the second aspect of the invention.

According to at least a fifth aspect of the present invention, the object is achieved by a computer program comprising program code means for performing the steps of the first aspect of the invention, when said program is run on a computer. The computer may e.g. be the control unit of the second aspect of the invention.

Effects and features of this fifth aspect of the present invention are largely analogous to those described above in connection with the first aspect of the invention. Embodiments mentioned in relation to the first aspect of the present invention are largely compatible with the fifth aspect of the invention.

According to at least a sixth aspect of the present invention, the object is achieved by a computer readable medium carrying a computer program comprising program code means for performing the steps of the first aspect of the invention, when said program product is run on a computer. The computer readable medium may e.g. be comprised in the control unit of the second aspect of the invention.

Effects and features of this sixth aspect of the present invention are largely analogous to those described above in connection with the first aspect of the invention. Embodiments mentioned in relation to the first aspect of the present invention are largely compatible with the sixth aspect of the invention.

According to a further aspect of the invention, the object is achieved by a combustion engine system comprising a combustion engine having an exhaust manifold and a turbocharger system in accordance with the third aspect of the invention. The combustion engine system may be comprised in a vehicle in accordance with the fourth aspect of the invention.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

Figure 1:
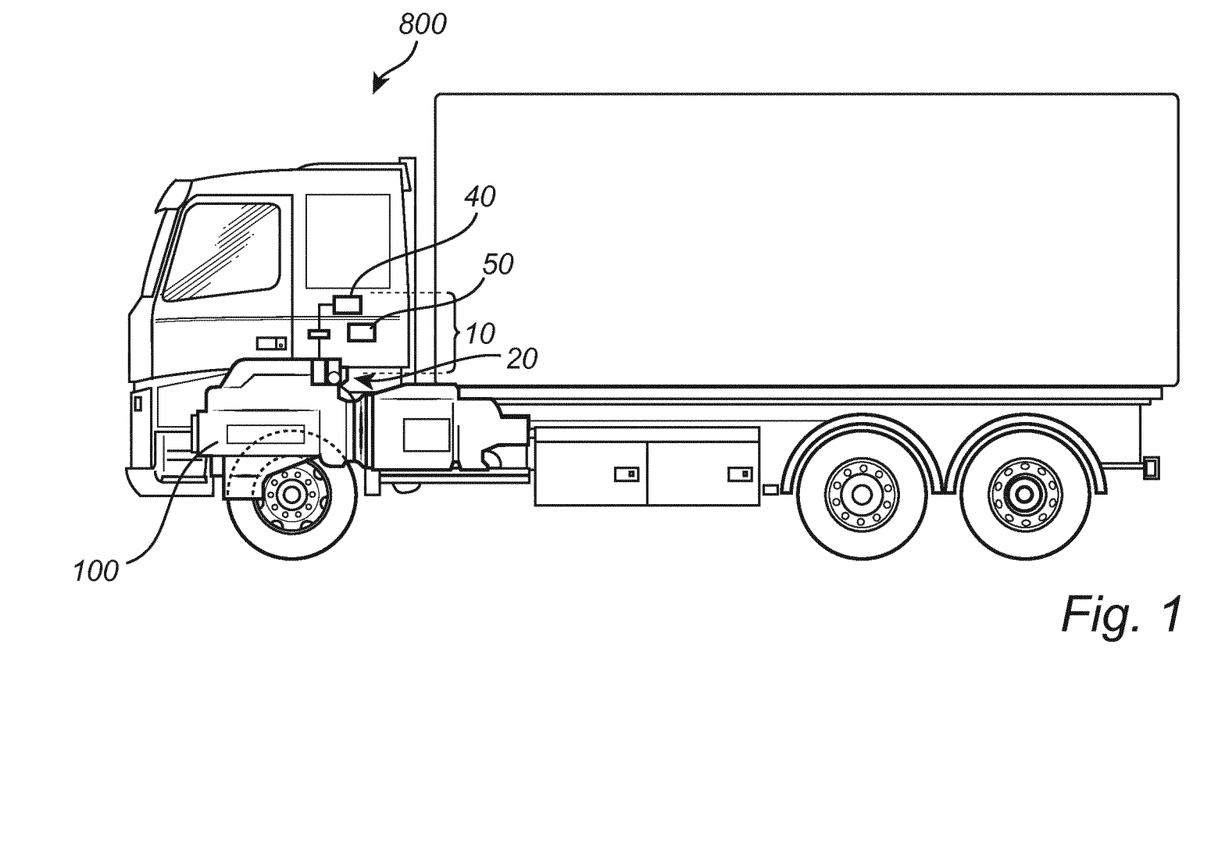
FIG. 1 is a side view of a vehicle comprising a combustion engine and a turbocharger system in accordance with one example embodiment of the present invention.

With particular reference to FIG. 1, there is provided a vehicle 800 with a combustion engine 100, such as an internal combustion engine 100, and a turbocharger system 10 comprising a turbocharger 20, a tank with pressurized air 40 and a control unit 50, such as an e.g. an ECU 50, according to the present invention (further described below with reference to FIG. 2). The vehicle 800 depicted in FIG. 1 is a truck 800 for which the inventive concept which will be described in detail below, is particularly suitable for.

Figure 2:
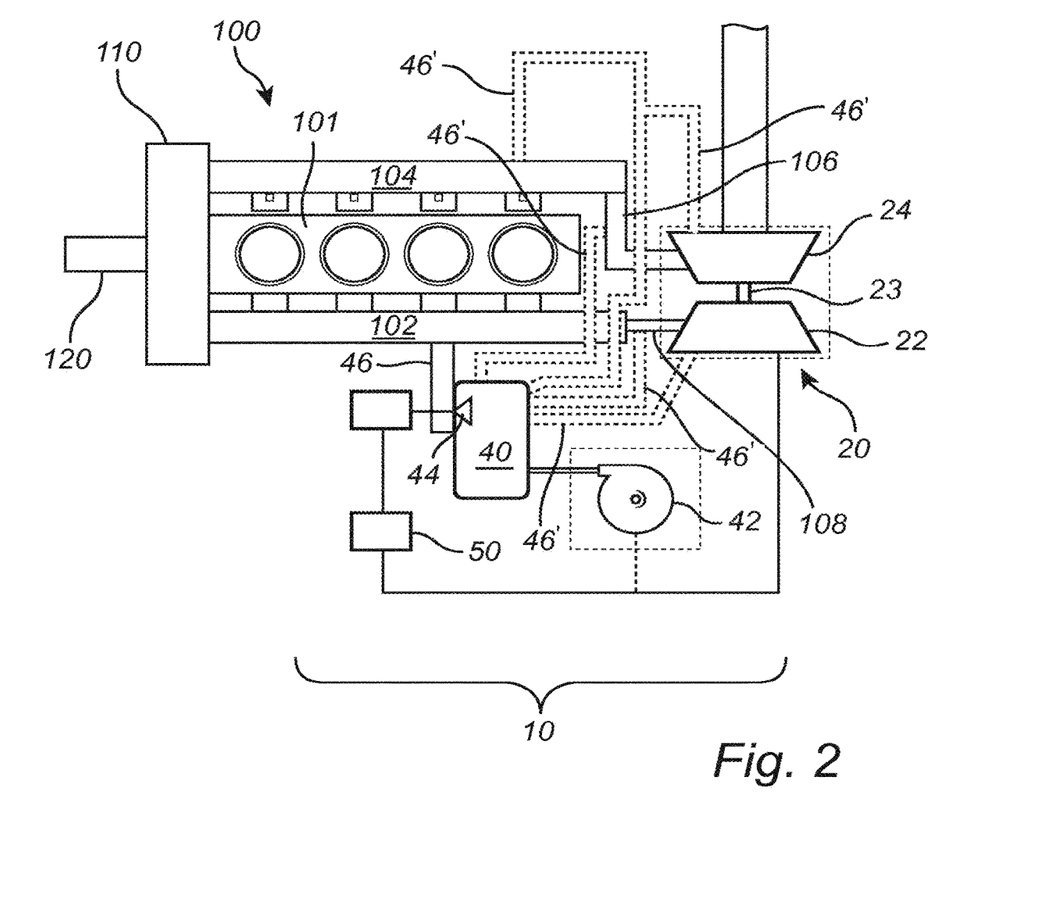
FIG. 2 shows a schematic overview of the combustion engine and the turbocharger system of FIG. 1, in accordance with one example embodiment of the present invention.

FIG. 2 shows a schematic overview of at least parts of a combustion engine 100 and a turbocharger system 10. In the non-limiting example of FIG. 2, the combustion engine 100 comprises an engine block 101 in a four-cylinder, four-stroke, diesel engine with a gear box 110 and a clutch (not shown) that is connected to an engine crankshaft 120. The combustion engine 100 of FIG. 2 comprises an inlet manifold 104 fluidly connected intake port (not shown) of the combustion engine, for supplying fuel and/or air and/or a fuel-air mixture to the combustion engine 100. Correspondingly, the combustion engine 100 comprises an exhaust manifold 102 fluidly connected to an exhaust after treatment system (not shown) of the combustion engine 100.

In the example of FIG. 2, the combustion engine 100 is overloaded by means of the turbocharger system 10. More specifically, the turbocharger system 10 comprises a turbocharger 20 having a turbocharger turbine 22 and a turbocharger compressor 24 of known type coupled to the turbocharger turbine 22 by a turbine shaft 23. The turbocharger turbine 22 is operable by exhaust gases from the exhaust manifold 102, and thus drives the turbocharger compressor 24 via the turbine shaft 23. The turbocharger compressor 24 is fluidly connected to the inlet manifold 104 via an inlet manifold pipe 106, and is configured for compressing intake air to the combustion engine 100. Optionally, an intercooler (not shown) may be arranged in fluid contact between the turbocharger compressor 24 and the inlet manifold 104. Correspondingly, the turbocharger turbine 22 is fluidly connected to the exhaust manifold 102 via an exhaust manifold pipe 108, and is configured for driving the turbocharger compressor 24 via the turbine shaft 23. In other words, the exhaust manifold pipe 108 is fluidly connected between the exhaust manifold 102 of the combustion engine 100 and the turbocharger turbine 22.

As shown in FIG. 2, the turbocharger system 10 further comprises a tank 40 with pressurized gas, a compressor 42 for supplying pressurized gas to the tank 40, and a valve 44 for controlling the release of pressurized gas from the tank 40. The turbocharger system 10 in FIG. 2 further comprises a control unit 50 connected to the valve 44 and the compressor 42. In FIG. 2, the valve 44 may control the release of pressurized gas from the tank 40 to various locations before, to, and after the combustion engine 100, typically via a valve pipe 46 fluidly connected to the valve 44 and the respective various locations. In FIG. 2, the valve pipe 46 is arranged to provide the pressurized gas from the tank 40 to The exhaust manifold 102, but as indicated with dashed valve pipes 46A, the pressurized gas from the tank 40 may alternatively be injected to the exhaust manifold pipe 108, the turbocharger turbine 22 casing, the inlet manifold 104, the turbocharger compressor 24 casing, or the inlet manifold pipe 106.

The operation of the turbocharger system 10, and the function of the control unit 50 will now be described in more detail. The control unit 50 is configured to determine a first operational mode in which zero fuel, or only a predetermined low amount of fuel, is injected to the combustion engine 100, for a predetermined time period; and, after the predetermined time period, configure to initiate injection of pressurized gas from the tank 40 to drive the turbocharger turbine 22. Hereby, the turbocharger turbine 22 is activated by the pressurized gas. The control unit 50 may determine the first operational mode by detecting, or setting, a condition in which zero fuel, or only a predetermined low amount of fuel, is injected to the combustion engine 100. Thus, the control unit 50 may thus be connected to control the combustion engine's fuel injection, or at least be configured to measure the fuel injection to the combustion engine 100. The predetermined time period may be at least 2 seconds long, such as e.g. between 3 seconds and 20 seconds. After such time, the boost pressure of the turbocharger turbine 22 has typically decreased to a low level, and the turbocharger system 10 may to a relatively high degree improve the torque response. Moreover, as the tank 40 may be charged or recharged during the first operational mode (described below), such time may be sufficient to charge or recharge the tank 40.

More specifically, the control unit 50 is configured to activate the turbocharger turbine 22 by controlling the operation of the valve 44 to release pressurized gas needed for activating the turbocharger turbine 22. The control unit 50 may e.g. be configured to release pressurized gas from the tank 40 for a pre-set time period of at least 0.5 second, or of at least 1 second, or between 1 second and 5 seconds. For example, the size of the tank, and the release of pressurized gas via the valve 44, may be sized and dimensioned such that the tank 40 is fully depleted or emptied after e.g. 5 seconds. Thus, the turbocharger system 10, and the turbocharger turbine 22, may be operated by pressurized gas from the tank 40 e.g. for at least 5 seconds.

When the tank 40 has been at least partly depleted or emptied, it may be recharged using e.g. the compressor 42. According to one embodiment, the control unit 50 is configured to initiate recharging of the tank 40 with pressurized gas using the compressor 42 during, or subsequent to, determining the first operational mode in which zero fuel, or only a predetermined low amount of fuel, is injected to the combustion engine 100. Thus it should be understood that the first operational mode may be occurring repeatedly, preferably separated in time by operational modes of a second type, i.e. a second operational mode, in which pressurized gas is injected from the tank 40 to drive the turbocharger turbine 22. During the second operational mode(s), fuel, at least at an amount above the predetermined low amount of fuel, may be injected into the combustion engine 100.

The present invention also relates to a method for controlling a turbocharger system, as e.g. the turbocharger system 10 shown in FIG. 2, for a combustion engine 100 having an exhaust manifold 102 (also show in FIG. 2), in a vehicle 800 (as e.g. shown in FIG. 1). Thus, the present invention will hereafter be described with reference to the above described combustion engine 100 and turbocharger system 10 in a non-limiting way, with reference to the flow-chart in FIG. 3 (hence, the reference numerals of FIG. 1 and FIG. 2 are used below when describing the steps of the method in the flow-chart in FIG. 3).

Figure 3:
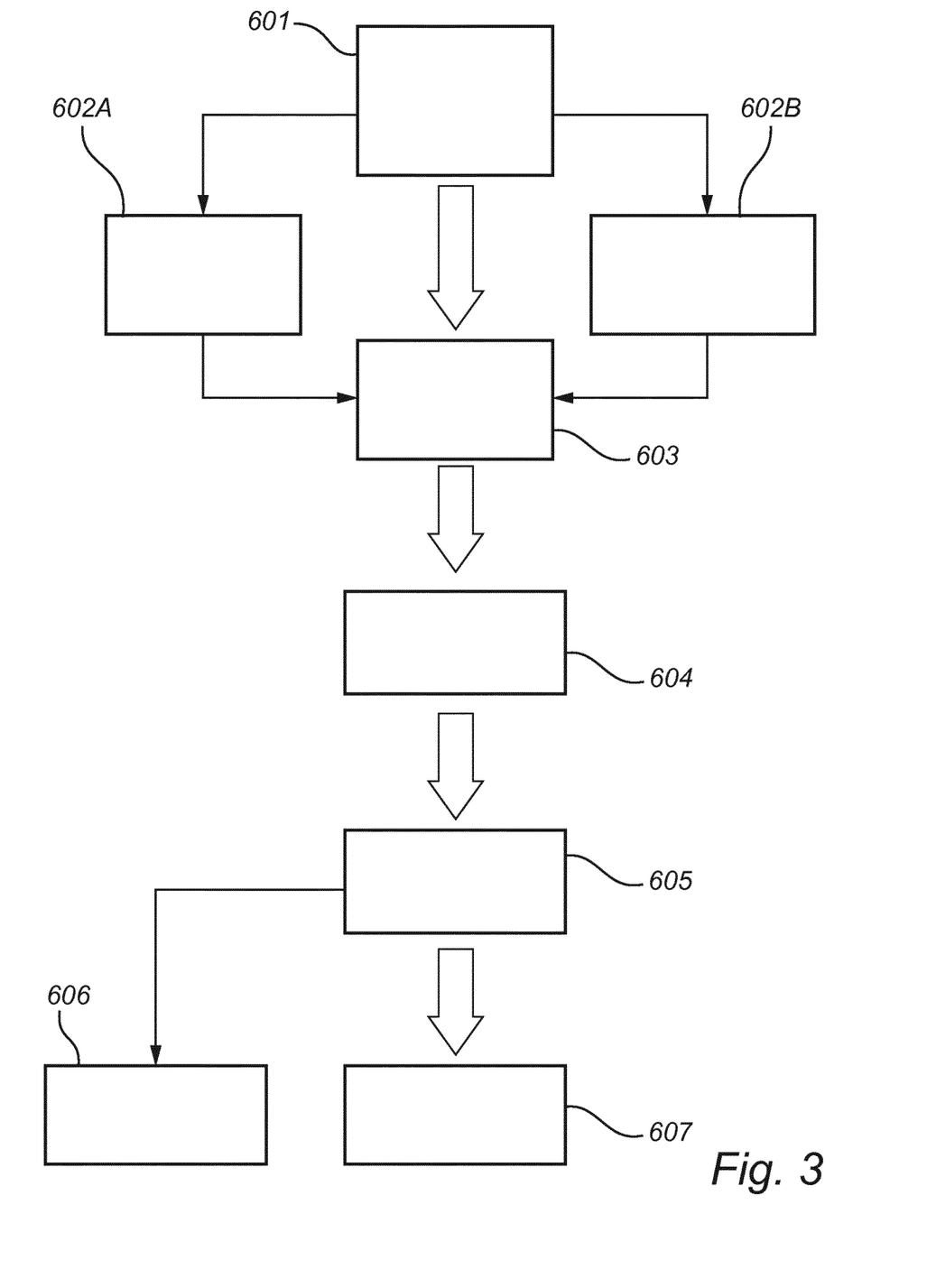
FIG. 3 is a flow chart describing the steps of a method for controlling a turbocharger system in accordance with some example embodiments of the invention.

In a first step 601, a first operational mode in which zero fuel, or only a predetermined low amount of fuel, is injected to the combustion engine 100 is determined for a predetermined time period. As explained previously, the first operational mode may for example be detected by the control unit 50, or may be set and controlled by the control unit 50 (i.e. the control unit 50 instructs the fuel injection of the combustion engine to operate according to the first operational mode). The first operational mode may be referred to as a first engine operational mode in which zero fuel (i.e. no fuel), or only a predetermined low amount of fuel, is injected into the combustion engine 100. That is, the combustion engine 100 may be operated in the first engine operational mode for the predetermined time period. Thus, in the first step 601, the first operational mode, or first engine operational mode, is occurring for the predetermined time period. According to an embodiment, the predetermined time period is at least 2 seconds long, such as e.g. between 3 seconds and 20 seconds.

According to at least one embodiment, the first operational mode is an operational mode of zero fuel injection to the combustion engine, and the first step 601 comprises determining the zero fuel condition in which zero fuel is injected to the combustion engine for the predetermined time period. Hence, for such embodiments, the alternative of having a predetermined low amount of fuel injection into the combustion engine 100 is omitted.

It should be understood that the vehicle 800 typically has a plurality of operational modes, and that some of the operational modes corresponds to engine operational modes, i.e. the latter being modes or states or conditions of how the combustion engine 100 is operated. Hence, in the above referred to first operational mode, the vehicle 100 is operated such that zero fuel, or only a predetermined low amount of fuel, is injected to the combustion engine 100. As described previously, the first operational mode may be followed by a second operational mode in which e.g. fuel, at least at an amount above the predetermined low amount of fuel, is injected into the combustion engine 100.

It should be noted that, the predetermined low amount of fuel may be defined as the amount of fuel required for maintaining a negative momentum to the engine crankshaft 120. Hence, during the first operational mode, the combustion engine 100 is operated in a non-contributing way to the rotation of the engine crankshaft 120. In other words, the engine crankshaft 120 is driving the combustion engine 100 in the first operational mode.

According to one embodiment, the first step 601 is performed during an operational mode in which the engine crankshaft 120 is rotating. Thus, for the vehicle 800, this corresponds to driving of the vehicle 800, i.e. during a driving mode of the vehicle 800. Hence, the first operational mode (e.g. in which zero fuel, or the predetermined low amount of fuel, is injected into the combustion engine 100) is not to be understood as that the vehicle has been completely shut down, but that the vehicle is typically moving and that the engine crankshaft 120 is rotating. Hence, a (complete) start-up of the vehicle 800 is not needed after the predetermined time in the first operational mode, in order to operate the combustion engine 100 and the turbocharger system 10.

According to one embodiment, the first step 601 may comprise, or be followed by, a first optional second step 602A in which the combustion engine 100 is subject to motoring, engine braking or fuel cut off. In other words, the step of determining an injection of zero fuel, or only a predetermined low amount of fuel, to the combustion engine 100 may comprise, or be comprised of, motoring, engine braking or providing a fuel cut off to, the combustion engine 100.

According to one embodiment, the first step 601 may comprise, or be followed by, a second optional second step 602B, in which the combustion engine 100 is declutched from the engine crankshaft 120, and in which the combustion engine 100 is stopped. Hereby, the rotation of the engine crankshaft 120 and the motion of the combustion engine 100 is independent of each other. In other words, the step of determining an injection of zero fuel, or only a predetermined low amount of fuel, to the combustion engine 100 may comprise, or be comprised of declutching the combustion engine 100 from the engine crankshaft 120 and stopping the combustion engine 100.

In an optional third step 603, fuel injection is initiated to the combustion engine 100 after the first step 601. Hereby, the timing of activating the turbocharger system 10 may be adapted to improve the torque response.

According to one embodiment, the turbocharger system 10 comprises a valve 44 for controlling the release of pressurized gas from the tank 40, as previously described. Thus, in an optional fourth step 604, the valve 44 is operated to release pressurized gas from the tank 40. As previously described, the valve 44 may be connected to a valve pipe 46 which in turn is connected to supply the pressurized gas to the exhaust manifold 102, the exhaust manifold pipe 108, the turbocharger turbine 22 casing, the inlet manifold 104, the turbocharger compressor 24 casing, and/or the inlet manifold pipe 106. The valve 44 may be operated in such a way that the pressurized gas is released from the tank 40 during at least 0.5 second, or at least 1 second, such as e.g. between 1 second and 5 seconds.

In a fifth step 605, carried out after the predetermined time period, and thus the first step 601, and optionally after any one of the first and second optional second steps 602A, 602B, and optionally after the third step 603 and the fourth step 604, pressurized gas from the tank 40 is injected to drive the turbocharger turbine 22, such that the turbocharger turbine 22 is activated by the pressurized gas. Thus, after a time period of having a zero fuel injection, or only a predetermined low amount of fuel injection, into the combustion engine 100, the turbocharger turbine 22 is activated. Hereby, the torque response can be improved.

Hence, according to one embodiment, the fifth step 605 may be carried out during the second operational mode, in which fuel, at least at an amount above the predetermined low amount of fuel, is injected to the combustion engine 100.

In an optional sixth step 606, the tank is charged or recharged by the compressor 42 configured for supplying pressurized gas to the tank 40. The charging or recharging may be carried during, or subsequent to, a step of determining the first operational mode (as e.g. the first step 601, or a step corresponding to the first step 601) in which zero fuel, or only a predetermined low amount of fuel, is injected to the combustion engine 100.

Moreover, and as indicated by a seventh step 607, the steps 601-606 of the method may be repeated, and the first and second operational modes may occur alternately. However, it should be noted that another operational mode, such as a third or fourth operational mode being different from the first and second operational modes may be interposed between the first and the second operational modes, or between the second and the first operational modes.

The control unit 50 may for example be manifested as a general-purpose processor, an application specific processor, a circuit containing processing components, a group of distributed processing components, a group of distributed computers configured for processing, a field programmable gate array (FPGA), etc. The control unit 50 may further include a microprocessor, microcontroller, programmable digital signal processor or another programmable device. The control unit 50 may also, or instead, include an application specific integrated circuit, a programmable gate array or programmable array logic, a programmable logic device, or a digital signal processor. Where the control unit 50 includes a programmable device such as the microprocessor, microcontroller or programmable digital signal processor mentioned above, the processor may further include computer executable code that controls operation of the programmable device.

The processor (of the control unit 50) may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 50 is connected to the various described features of the combustion engine 100 and the turbocharger system 10, and is configured to control system parameters. Moreover, the control unit 50 may be embodied by one or more control units, where each control unit may be either a general purpose control unit or a dedicated control unit for performing a specific function.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be understood that the control unit 50 may comprise a digital signal processor arranged and configured for digital communication with an off-site server or cloud based server. Thus data may be sent to and from the control unit 50.

It is to be understood that the present invention is not limited to the embodiments described above and illustrated in the drawings; rather, the skilled person will recognize that many changes and modifications may be made within the scope of the appended claims. Thus, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling a turbocharger system fluidly connected to an exhaust manifold of a combustion engine said turbocharger system comprising a tank with pressurized gas, and a turbocharger turbine operable by exhaust gases from said exhaust manifold, said tank being fluidly connectable to said turbocharger turbine, said method comprising the steps of: determining a first operational mode in which zero fuel, or only a low predetermined amount of fuel, is injected to the combustion engine, for a predetermined time period; and, after said predetermined time period, injecting pressurized gas from said tank to drive said turbocharger turbine, such that the turbocharger turbine is activated by said pressurized gas, wherein said predetermined time period is at least 2 seconds long.

2. A method according to claim 1, in which said first operational mode is an operational mode of zero fuel injection to the combustion engine, and said step of determining said first operational mode comprises determining a zero fuel condition in which zero fuel is injected to the combustion engine for the predetermined time period.

3. A method according to claim 1, wherein said predetermined low amount of fuel is defined as the amount of fuel required for maintaining a negative momentum to the engine crankshaft to which the combustion engine is coupled to.

4. A method according to claim 1, wherein the method comprises the step of: initiating fuel injection to the combustion engine after said step of determining said first operational mode, and prior to said step of injecting pressurized gas from said tank to drive said turbocharger turbine.

5. A method according to claim 1, wherein the step of determining said first operational mode is performed during an operational mode in which the engine crankshaft is rotating.

6. A method according to claim 1, comprising the step of motoring, engine braking or providing fuel cut off to the combustion engine prior to the step of injecting pressurized gas from said tank to drive said turbocharger turbine.

7. A method according to claim 1, comprising the steps of declutching the combustion engine from the engine crankshaft, and stopping the combustion engine prior to the step of injecting pressurized gas from said tank to drive said turbocharger turbine.

8. A method according to claim 1, wherein said turbocharger system comprises a valve for controlling the release of pressurized gas from said tank, comprising the step of: operating the valve to release pressurized gas needed for activating the turbocharger turbine.

9. A method according to claim 8, wherein the valve is operated in such a way that the pressurized gas is released from said tank during at least 0.5 second.

10. A method according to claim 8, wherein said turbocharger system further comprises a turbocharger compressor driven by said turbocharger turbine, and said combustion engine comprises an inlet manifold fluidly connected to said turbocharger compressor, wherein said valve controls the release of pressurized gas from said tank to the exhaust manifold of the combustion engine, or to an exhaust manifold pipe arranged between the exhaust manifold and the turbocharger turbine, or to the turbocharger turbine casing, or to the inlet manifold of the combustion engine, or to the turbocharger compressor casing, or to an inlet manifold pipe arranged between the inlet manifold and the turbocharger compressor.

11. A method according to claim 1, wherein said turbocharger system comprises a compressor for supplying pressurized gas to said tank, comprising the step of charging or recharging the tank with pressurized gas using said compressor, during, or subsequent to, a step of determining said first operational mode in which zero fuel, or only a predetermined low amount of fuel, is injected to the combustion engine.

12. A control unit configured to perform the steps of the method according to claim 1.

13. A computer program comprising program code for performing the steps of claim 1, when said program code is run on a computer.

14. A computer readable medium carrying a computer program comprising program code for performing the steps of claim 1, when said program code is run on a computer.

15. A turbocharger system according to claim 1, wherein the pre-set time period is between 3 second and 20 seconds.

16. A turbocharger system for use together with a combustion engine having an exhaust manifold, said turbocharger system comprising: a turbocharger turbine operable by exhaust gases from said exhaust manifold, a tank comprising pressurized gas, said tank being fluidly connectable to said turbocharger turbine, and a control unit characterized in that the control unit is configured to determine a first operational mode in which zero fuel, or only a predetermined low amount of fuel, is injected to the combustion engine, for a predetermined time period; and, after said predetermined time period, initiate injection of pressurized gas from said tank to drive said turbocharger turbine, such that the turbocharger turbine is activated by said pressurized gas, wherein said predetermined time period is at least 2 seconds long.

17. A turbocharger system according to claim 16, comprising a valve for controlling the release of pressurized gas from said tank, wherein said control unit is configured to control the operation of the valve to release pressurized gas needed for activating the turbocharger turbine for a pre-set time period of at least 0.5 second.

18. A turbocharger system according to claim 16, comprising a compressor for supplying pressurized gas to said tank, wherein said control unit is configured to initiate recharging of the tank with pressurized gas using said compressor during, or subsequent to, determining said first operational mode in which zero fuel, or only a predetermined low amount of fuel, is injected to the combustion engine.

19. A vehicle comprising a turbocharger system according to claim 16.

20. A turbocharger system according to claim 16, wherein the pre-set time period is between 3 second and 20 seconds.

21. A turbocharger system for use together with a combustion engine having an exhaust manifold, said turbocharger system comprising:
a turbocharger turbine operable by exhaust gases from said exhaust manifold;
a tank comprising pressurized gas, said tank being fluidly connectable to said turbocharger turbine;
a control unit configured to determine a first operational mode in which zero fuel, or only a predetermined low amount of fuel, is injected to the combustion engine, for a predetermined time period; and, after said predetermined time period, initiate injection of pressurized gas from said tank to drive said turbocharger turbine, such that the turbocharger turbine is activated by said pressurized gas; and a valve for controlling the release of pressurized gas from said tank, wherein said control unit is configured to control the operation of the valve to release pressurized gas needed for activating the turbocharger turbine for a pre-set time period of at least 0.5 second.

22. A turbocharger system according to claim 21, wherein the pre-set time period is at least 1 second.

23. A turbocharger system according to claim 21, wherein the pre-set time period is between 1 second and 5 seconds.

* * * * *